United States Patent [19]

Shibuya et al.

[11] Patent Number: 5,302,176
[45] Date of Patent: Apr. 12, 1994

[54] METHOD OF AND APPARATUS FOR BENDING SHEET GLASS

[75] Inventors: Takashi Shibuya, Tokyo; Kazuo Yamada, Kanagawa, both of Japan

[73] Assignee: Nippon Sheet Glass Co., Ltd., Japan

[21] Appl. No.: 940,452

[22] Filed: Sep. 4, 1992

[30] Foreign Application Priority Data

Sep. 4, 1991 [JP] Japan .................... 3-253132

[51] Int. Cl.⁵ ............................ C03B 23/023
[52] U.S. Cl. ........................ 65/106; 65/273; 65/289
[58] Field of Search ............ 65/106, 268, 273, 289

[56] References Cited

U.S. PATENT DOCUMENTS

| | | | |
|---|---|---|---|
| 4,501,603 | 2/1985 | Frank et al. | 65/106 |
| 4,514,208 | 4/1985 | Nitschke | 65/273 |
| 4,756,735 | 7/1988 | Cathers | 65/106 |

FOREIGN PATENT DOCUMENTS

| | | |
|---|---|---|
| 63-156025 | 6/1988 | Japan . |
| 1-230439 | 9/1989 | Japan . |
| 2-38331 | 2/1990 | Japan . |
| 2-38332 | 2/1990 | Japan . |
| 2-55240 | 2/1990 | Japan . |

Primary Examiner—Joye L. Woodard
Attorney, Agent, or Firm—Merchant, Gould, Smith, Edell, Welter & Schmidt

[57] ABSTRACT

A furnace for heating a glass sheet therein has a gravity bending zone for bending the glass sheet due to gravity, a press bending zone for bending the glass sheet under pressure, and an annealing zone for annealing the bent glass sheet. In the gravity bending zone, the glass sheet on a ring mold is preliminarily bent due to gravity. After the preliminarily bent glass sheet has been fed from the gravity bending zone into the press bending zone, the glass sheet is transferred from the ring mold to a movable lower mold assembly. The lower mold assembly is lifted to press the glass sheet against a fixed upper mold for finally bending the glass sheet. Thereafter, the lower mold with the finally bent glass sheet is lowered until the glass sheet is placed on the ring mold. Then, the glass sheet is fed with the ring mold into the annealing zone in which the glass sheet is annealed.

11 Claims, 10 Drawing Sheets

METHOD OF AND APPARATUS FOR BENDING SHEET GLASS

BACKGROUND OF THE INVENTION

1. Field of the Invention

The present invention relates to a method of and an apparatus for bending sheets of glass for use as a laminated sheet of glass.

2. Description of the Prior Art

Heretofore, it has been customary to form laminated sheets of glass for use as automobile front windshields or the like by conveying two sheets of glass on a ring mold through a furnace and preliminarily and then finally shaping the sheets of glass while they are in the furnace.

Various known apparatus for manufacturing such laminated glass sheets are disclosed in Japanese laid-open patent publications Nos. 63-156025, 1-230439, 2-38331, 2-38332, and 2-55240, for example. The apparatus shown in Japanese laid-open patent publication No. 63-156025 has a gravity bending zone and a press bending zone in a furnace. While sheets of glass are being conveyed on a ring mold through the furnace, they are first preliminarily shaped or bent by gravity in the gravity bending zone, and then finally shaped in the press bending zone by an upper mold which is lowered toward the ring mold. Thereafter, the bent sheets of glass are annealed on the ring mold. In the apparatus shown in Japanese laid-open patent publication No. 1-230439, a presser is mounted on a carrier on which a ring mold is supported, and an auxiliary press in a press bending zone is actuated to press opposite sides of glass sheets to shape between the ring mold and the presser. The apparatus disclosed in Japanese laid-open patent publication No. 2-38331 has two parallel furnaces, one for preliminarily shaping glass sheets and one for finally shaping glass sheets, and a feeder for feeding the glass sheets between these furnaces. Japanese laid-open patent publication No. 2-38332 discloses a heater disposed in an upper mold which cooperates with a ring mold in pressing glass sheets to shape in a press bending zone. According to the apparatus disclosed in Japanese laid-open patent publication No. 2-55240, sheets of glass are pressed to shape between an upper mold and a ring mold in a press bending zone, and then edge regions of the glass sheets are tempered with a special cooling mold.

In either one of the above conventional apparatus, the ring mold which has been used to convey or preliminarily bend the glass sheets is used again to finally bend the glass sheets in the press bending zone. Therefore, the ring mold is required to be rugged enough to withstand the pressure that is applied when the glass sheets are pressed to shape in the press bending zone. As a result, the ring mold is relatively heavy and a large expenditure of energy and time is needed to move the ring mold. The fact that the ring mold has a shape complementary to the shape of a final laminated glass sheet product makes the ring mold unsuitable for the preliminary shaping of glass sheets. Moreover, inasmuch as the ring mold doubles as a lower mold at the time the glass sheets are pressed to shape by the upper mold and also as a support for the glass sheets when they are conveyed, the upper mold has to be moved downwardly and upwardly for pressing the glass sheets. The requirement to lift and lower the upper mold results in a complex overall apparatus construction.

SUMMARY OF THE INVENTION

It is an object of the present invention to provide a method of and an apparatus for bending sheets of glass using a relatively light ring mold for conveying the sheets of glass and a vertically movable lower mold for pressing the sheets of glass against a fixed upper mold.

According to the present invention, there is provided an apparatus for bending a glass sheet, comprising a furnace for heating a glass sheet therein, the furnace having a gravity bending zone for bending the glass sheet due to gravity, a press bending zone for bending the glass sheet under pressure, and an annealing zone for annealing the bent glass sheet, and a ring mold for supporting the glass sheet thereon, the ring mold being movable, with the glass sheet supported thereon, along a feed path successively through the gravity bending zone, the press bending zone, and the annealing zone, the ring mold comprising a central member and a pair of opposite wings angularly movably coupled to the central member, the press bending zone comprising a fixed upper mold, a mold opening mechanism for turning the wings with respect to the central member when the ring mold is in the press bending zone, a movable lower mold assembly disposed below the fixed upper mold, and actuating means for moving the movable lower mold assembly to engage opposite edges of the glass sheet supported on the ring mold with the wing turned by the mold opening mechanism, and to lift and press the glass sheet against the upper mold.

According to the present invention, there is also provided an apparatus for bending a glass sheet, comprising a furnace for heating a glass sheet therein, the furnace having a gravity bending zone for bending the glass sheet due to gravity, a press bending zone for bending the glass sheet under pressure, and an annealing zone for annealing the bent glass sheet, and a ring mold for supporting the glass sheet thereon, the ring mold being movable, with the glass sheet supported thereon, along a feed path successively through the gravity bending zone, the press bending zone, and the annealing zone, the ring mold comprising a central member and a pair of opposite wings angularly movably coupled to the central member, the press bending zone comprising a fixed upper mold, means disposed below the fixed upper mechanism for lifting the glass sheet off the ring mold when the ring mold is in the press bending zone, a movable lower mold assembly disposed below the fixed upper mold, and actuating means for moving the movable lower mold assembly to engage the glass sheet lifted off the ring mold, and to lift and press the glass sheet against the upper mold.

The movable lower mold assembly comprises a pair of lower molds positioned laterally one on each side of the feed path for engaging the opposite edges, respectively, of the glass sheet supported on the ring mold. The actuating means is disposed outside of the furnace. The apparatus further includes an actuator mechanism disposed underneath the press bending zone for actuating the mold opening mechanism.

According to the present invention, there is further provided a method of bending a glass sheet, comprising the steps of preliminarily bending a glass sheet on a ring mold in a gravity bending zone in a furnace, feeding the preliminarily bent glass sheet with the ring mold along a feed path into a press bending zone in the furnace, transferring the glass sheet from the ring mold to a movable lower mold assembly in the pressing bending zone, lifting the lower mold assembly to press the glass sheet against a fixed upper mold for finally bending the glass sheet, thereafter, lowering the lower mold with the finally bent glass sheet until the glass sheet is placed on the ring mold, and feeding the glass sheet with the ring mold into an annealing zone in the furnace.

According to the present invention, there is also provided a method of bending a glass sheet, comprising the steps of preliminarily bending a glass sheet on a ring mold in a gravity bending zone in a furnace, feeding the preliminarily bent glass sheet with the ring mold along a feed path into a press bending zone in the furnace, lifting the glass sheet off the ring mold in the press bending zone, transferring the lifted glass sheet to a movable lower mold assembly in the pressing bending zone, lifting the lower mold assembly to press the glass sheet against a fixed upper mold for finally bending the glass sheet, thereafter, lowering the lower mold with the finally bent glass sheet until the glass sheet is placed on the ring mold, and feeding the glass sheet with the ring mold into an annealing zone in the furnace.

The movable lower mold assembly comprises a pair of lower molds positioned laterally one on each side of the feed path, and the step of transferring comprising the steps of moving the lower molds into engagement with opposite edges of the glass sheet and moving the lower molds to lift the glass sheet off the ring mold.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENTS

Figure 1:
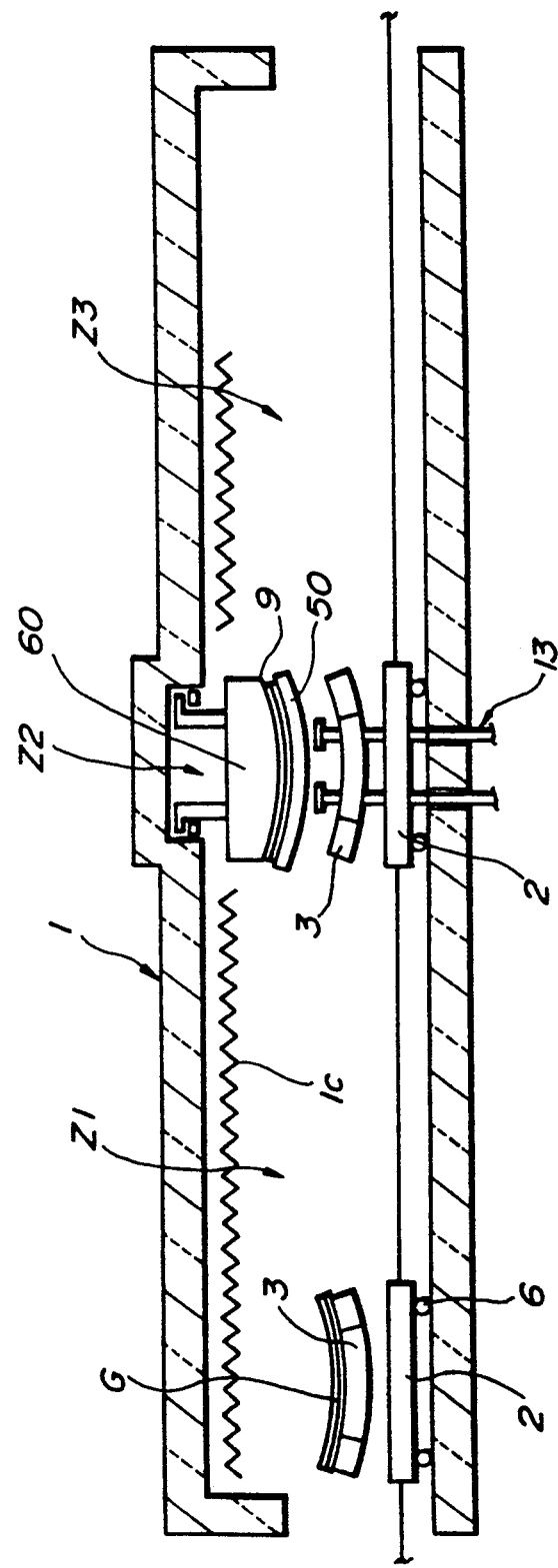
FIG. 1 is a side elevational view of an apparatus for bending sheets of glass according to the present invention.

As shown in FIG. 1, an apparatus for bending sheets of glass according to the present invention includes a furnace 1 whose inner chamber is divided into a gravity bending zone Z1, a press bending zone Z2, and an annealing zone Z3 that are arranged successively downstream along a feed path in which two glass sheets G are fed through the furnace 1. The glass sheets G are placed on and conveyed by a ring mold 3 which is mounted on a carrier 2 movable successively through the zones Z1, Z2, Z3 in the furnace 1.

Figure 2:
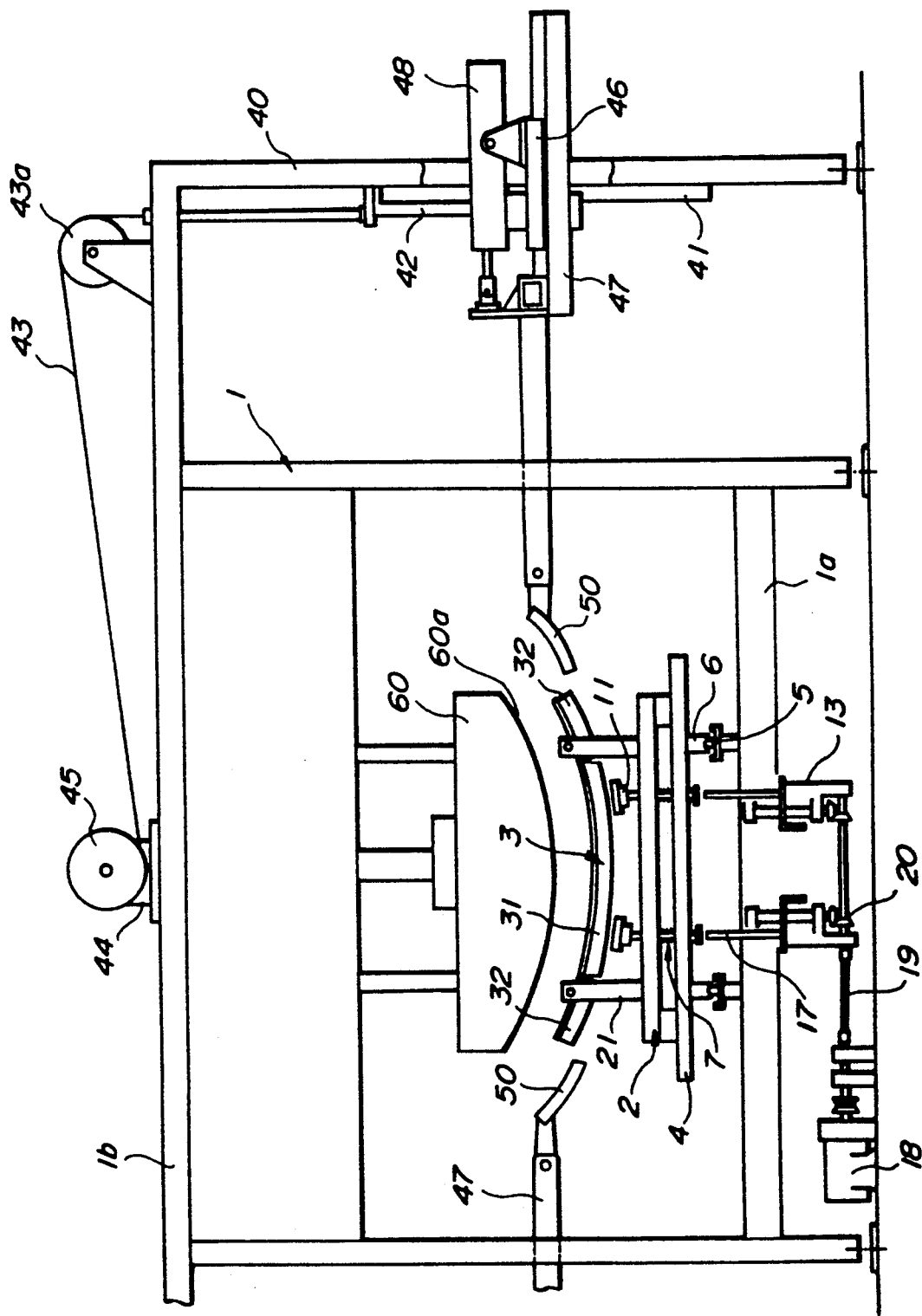
FIG. 2 is an enlarged front elevational view of a press bending zone of the apparatus shown in FIG. 1.
Figure 3:
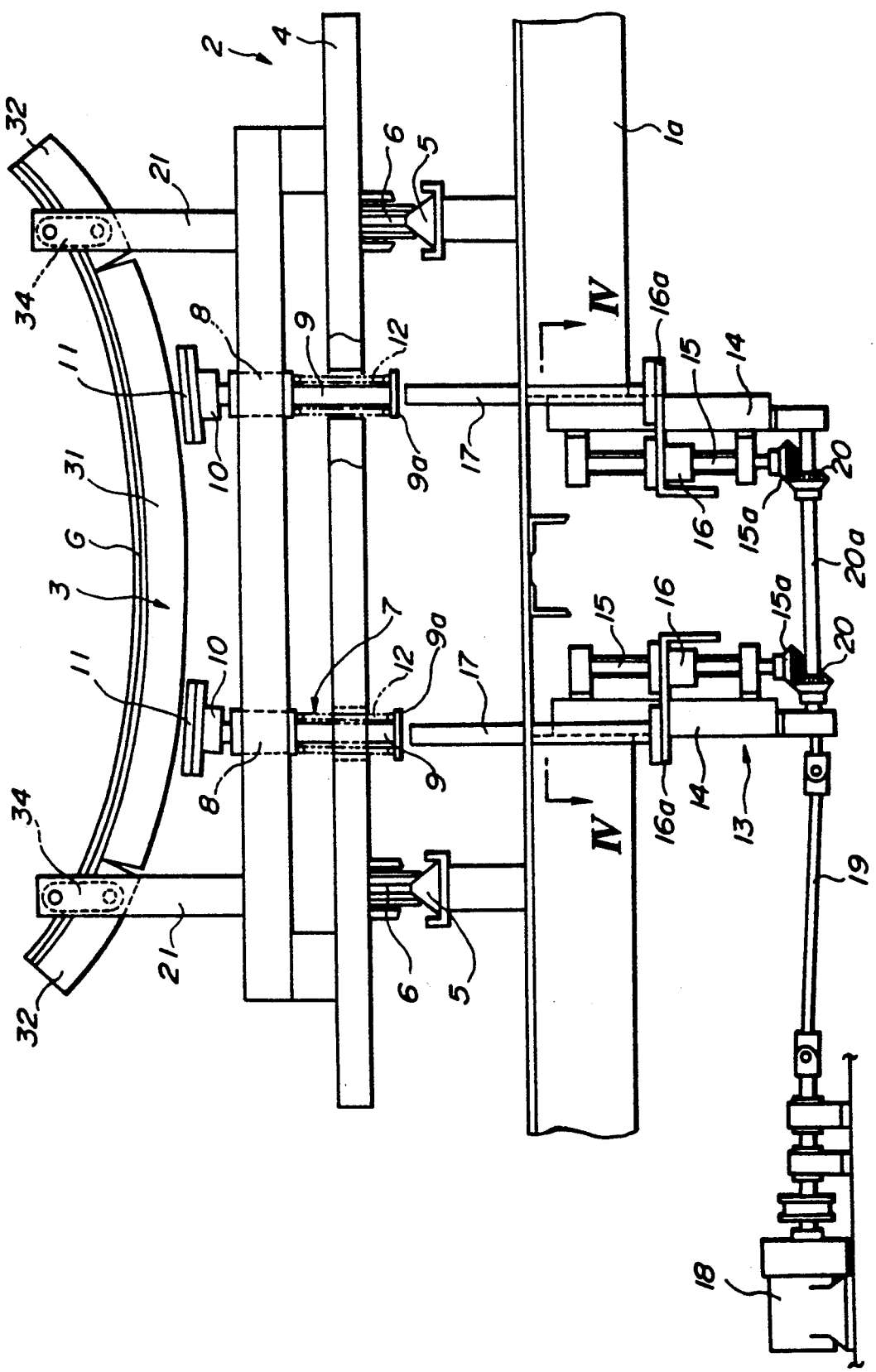
FIG. 3 is an enlarged fragmentary front elevational view of a ring mold and a mold opening mechanism.
Figure 4:
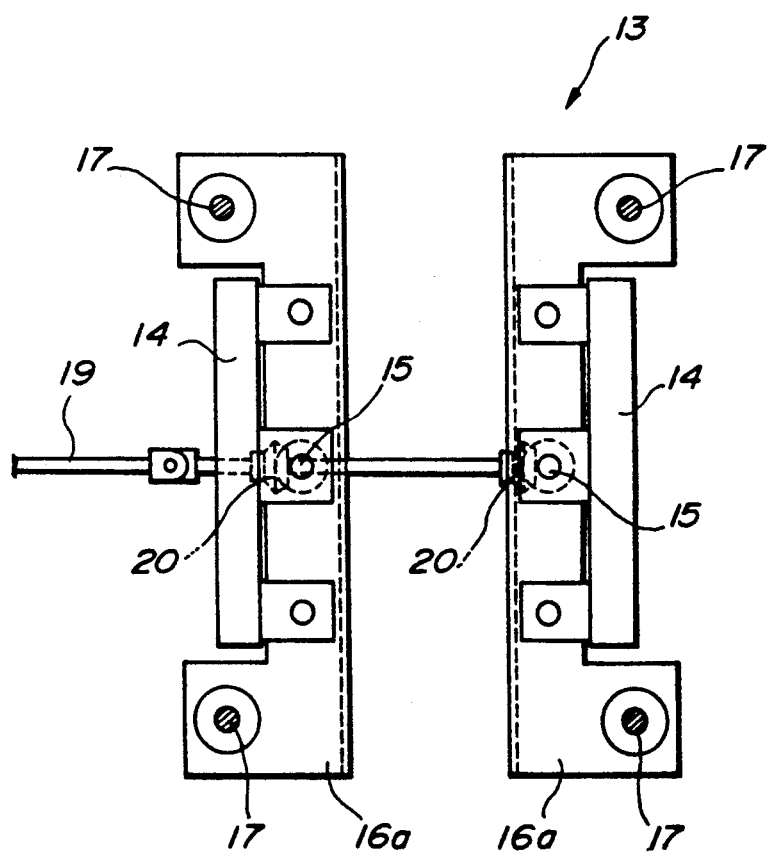
FIG. 4 is a cross-sectional view taken along line IV—IV of FIG. 3.

As shown in FIGS. 2 and 3, the carrier 2 has a plurality of rollers 6 rotatably supported on the lower side of a carrier chassis 4. The rollers 6 are held in rolling engagement with a pair of parallel rails 5 mounted on a lower furnace frame 1a, so that the carrier 2 can move along the rails 5 in the furnace 1.

The carrier 2 supports a mold opening mechanism for opening the ring mold 3. Specifically, as shown in FIG. 3, the mold opening mechanism 7 has four (only two shown) spaced vertical shafts 9 extending through respective bearings 8 mounted on the carrier chassis 4. Four pads 11 are mounted on the respective upper ends of the shafts 9 through spherical bearings 10, respectively. The shafts 9 are normally urged to move downwardly under the bias of respective coil springs 12 which are disposed around the shafts 9 and act between the lower ends of the bearings 8 and flanges 9a fixed to the lower ends of the shafts 9.

As shown in FIG. 1, an actuator mechanism 13 for actuating the mold opening mechanism 7 is disposed underneath the press bending zone Z2. As shown in FIG. 3, the actuator mechanism 13 comprises a pair of vertical screws 15 rotatably supported by respective vertical guides 14 fixed to the lower furnace frame 1a. The screws 15 threadedly extend through respective nuts 16 having respective horizontal flanges 16a to which there are vertically secured four lifter rods 17 and which are held in sliding engagement with the vertical guides 14. The lifter rods 17 are positioned directly below the shafts 9, respectively. The actuator mechanism 13 also has an electric motor 18 mounted on a floor and operatively coupled through a link 19 to a pair of bevel gears 20 mounted on a shaft 20a rotatably supported on the guides 14. The bevel gears 20 are held in mesh with respective bevel gears 15a fixedly connected to the lower ends of the respective screws 15. Therefore, when the electric motor 18 is energized, its rotation is transmitted through the link 19, the shaft 20a, the bevel gears 20, 15a to the screws 15, thereby vertically moving the nuts 16 and hence the lifter rods 17 along the guides 14.

Figure 5:
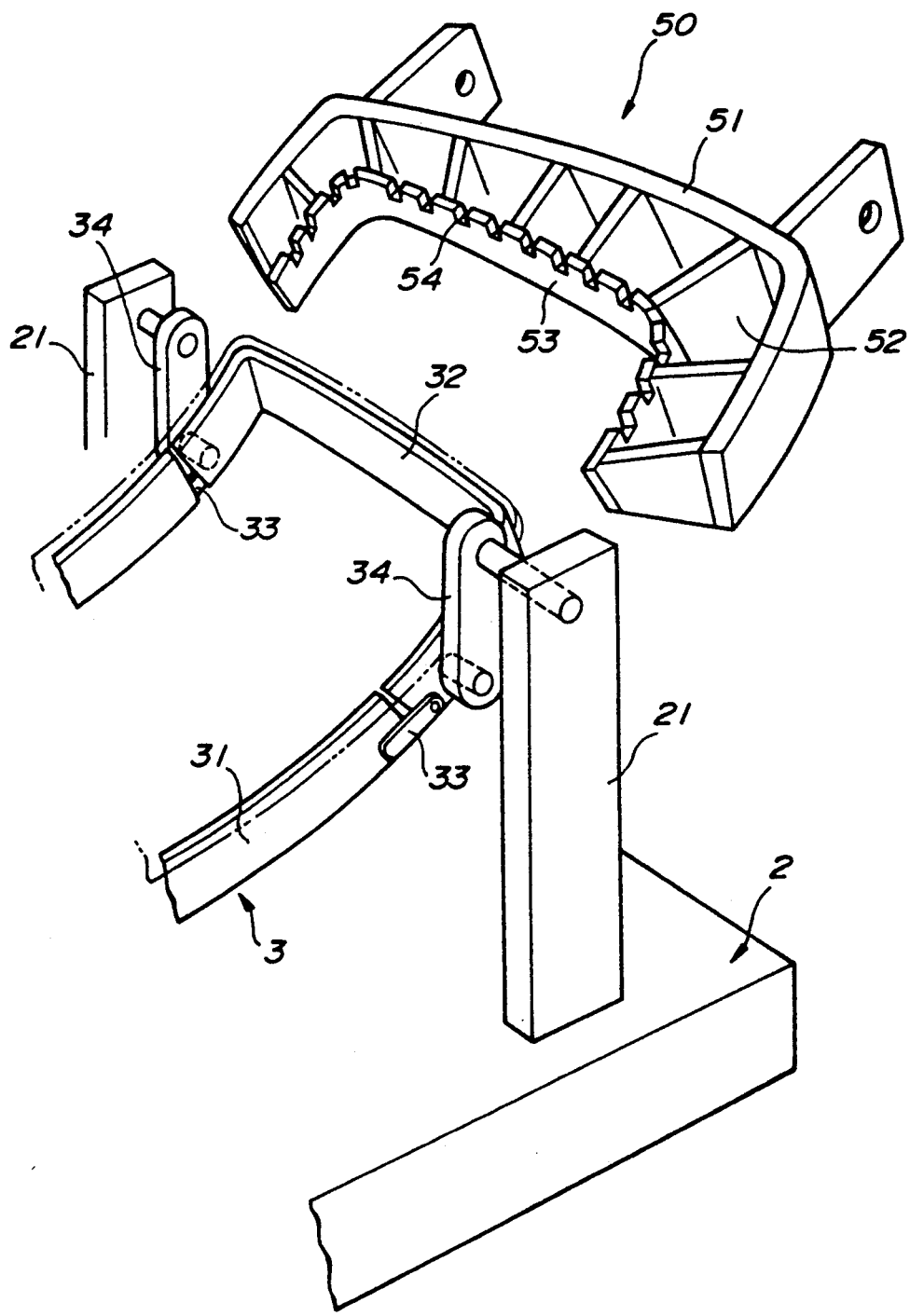
FIG. 5 is a fragmentary perspective view showing the positional relationship between a lower mold and the ring mold.

As shown in FIGS. 2, 3, and 5, the ring mold 3 comprises a central member 31 and a pair of opposite C-shaped wings 32 which are swingably coupled to opposite ends of the central member 31 through respective links 33. Each of the wings 32 is pivotally coupled to and suspended from a pair of vertical support columns 21 through respective links 34. The vertical support columns 21 are mounted on the carrier chassis 4. The central member 31 is coupled to only the wings 32 through the links 33, so that the central member 31 dangles from the wings 32 due to gravity. When the central member 31 dangles from the wings 32 due to gravity, they jointly provide a smooth upper surface which is concave as shown in FIGS. 2 and 3.

Figure 6:
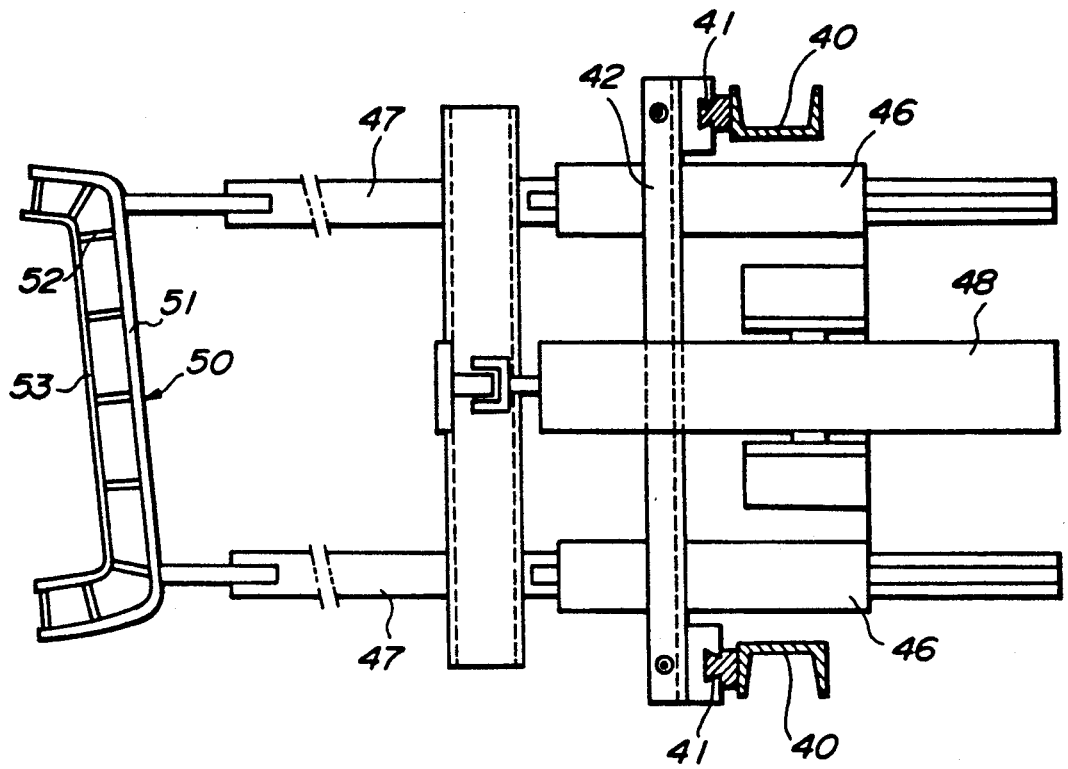
FIG. 6 is a plan view of the lower mold with associated components.

Two pairs of vertical support columns 40 (only one shown in FIG. 2) are mounted on the floor outside of the furnace 1, one pair on each side of the press bending zone Z2. As shown in FIGS. 2 and 6, a vertically movable carriage 42 is held in sliding engagement with a pair of vertical guide rails 41 mounted on the respective support columns 40 in each pair. The carriage 42 is coupled to a wire 43 which is trained around an idler roller 43a rotatably mounted on one side of an upper furnace frame 1b. The wire 43 is also trained around a pulley 45 coupled to an electric motor 44 that is installed centrally on the upper furnace member 1b. Accordingly, when the electric motor 44 is energized, the carriage 42 is vertically moved along the guide rails 42.

A pair of spaced horizontal rails 46 is fixedly supported on the carriage 42 between the support columns 40, and a pair of horizontal arms 47 is slidably supported by the respective rails 46 for movement therealong. The arms 47 have respective distal ends disposed in the furnace 1. The arms 47 are coupled to a cylinder unit 48 which is supported on the carriage 42. When the cylinder unit 48 is actuated, the arms 47 are slidingly moved along the rails 46, respectively, and hence the distal ends of the arms 47 are horizontally moved in the furnace 1.

Figure 7:
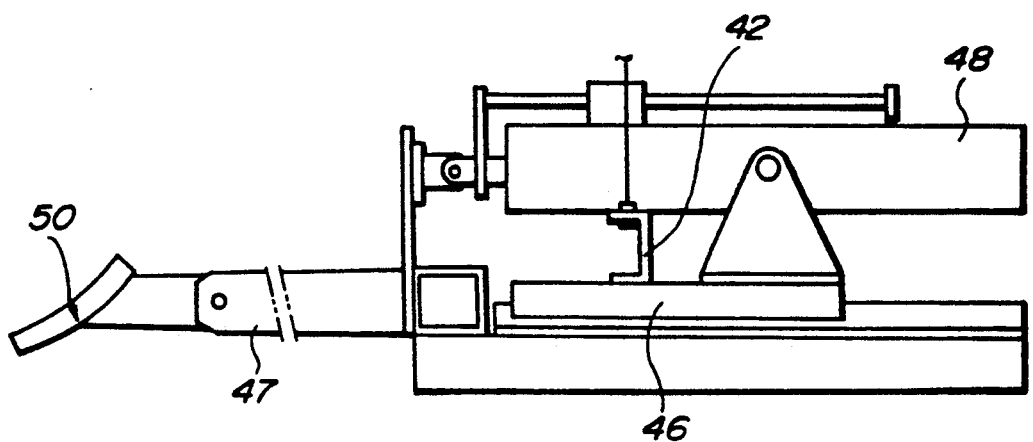
FIG. 7 is a front elevational view of the lower mold with associated components.

As shown in FIGS. 6 and 7, a lower mold 50 is supported on the distal ends of the arms 47 supported on the carriage 42 mounted on the support columns 40 in each pair. Therefore, there are two lower molds 50 disposed one on each side of the feed path in the furnace 1, as illustrated in FIG. 2. As shown in FIGS. 5 and 6, each lower mold 50 comprises an outer member 51 and an inner member 53 coupled to the outer member 51 by a plurality of stays 52. The inner member 53 is of a C shape which is substantially the same as the shape of the wing 32 of the ring mold 3. The inner member 53 has a plurality of recesses 54 (FIG. 5) defined in an upper edge thereof for releasing therethrough heated air which would otherwise be trapped between the lower mold 50 and the glass sheets G when the glass sheets G are pressed to shape. The upper edge of the inner member 53 should preferably be covered with a stainless steel cloth or the like.

As shown in FIGS. 1 and 2, an upper mold 60 is fixed to the upper furnace member 1b in the press bending zone Z2. The upper mold 60 has a fully continuous lower molding surface 60a which should also preferably be covered with a stainless steel cloth or the like. The lower molding surface 60a is of a downwardly convex shape complementarily to the curved shape to which the glass sheets G are to be bent under pressure. The upper mold 60 may be supported on the upper furnace member 1b such that it can slightly be moved vertically by a cylinder unit.

Operation of the apparatus described above with reference to FIGS. 1 through 7 for bending glass sheets G will be described below with reference to FIGS. 8(a) through 8(e).

Figure 8A:
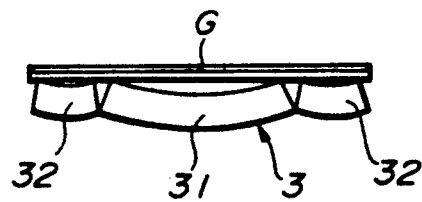
FIGS. 8(a) through 8(e) are front elevational views illustrative of a glass sheet bending process.
Figure 8B:
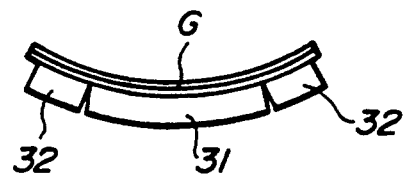

Glass sheets G which are substantially flat and are not heated yet are placed on the ring mold 3. Since the glass sheets G are flat and not softened yet, they act on the wings 32 of the ring mold 3, turning the wings 32 outwardly, i.e., clockwise and counterclockwise, respectively, with the central member 31 lifted slightly therebetween, as shown in FIG. 8(a). At this time, the glass sheets G are supported in point-to-point contact with the central member 31 and the wings 32. The ring mold 3 in this condition is referred to as being "open." When the glass sheets G are then conveyed through the gravity bending zone Z1 by the carrier 2, they are heated by a heater 1c in the furnace 1. As the glass sheets G are softened with heat, they are gradually bent downwardly, i.e., preliminarily bent, due to gravity, allowing the wings 32 to turn inwardly with the central member 31 slightly lowered. The bent glass sheets G are now snugly held against the convex upper surface which is jointly provided by the central member 31 and the wings 32, as shown in FIG. 8(b).

Figure 8C:
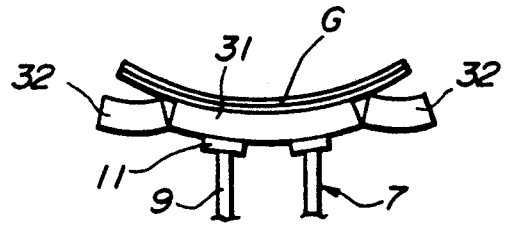

The preliminarily bent glass sheets G are then fed into the press bending zone Z2 by the carrier 2. In the press bending zone Z2, the actuator mechanism 13 is actuated to elevate the shafts 9 of the mold opening mechanism 7 to enable the pads 11 to push the central member 31 of the ring mold 3 upwardly. The upwardly moving central member 31 forces the wings 32 turn outwardly, thus opening the ring mold 3, as shown in FIG. 8(c). Now, gaps are created between the wings 32 and the glass sheets G.

Figure 8D:
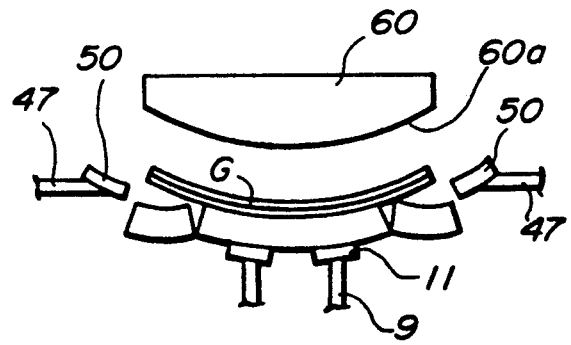
Figure 8E:
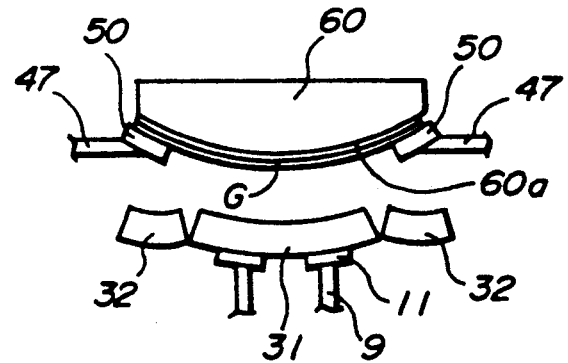

Then, as shown in FIG. 8(d), the arms 47 are horizontally moved into the furnace 1 by the cylinder units 48 to insert the lower molds 50 into the gaps between the wings 32 and the glass sheets G. The electric motor 40 is then energized to move the carriages 42 and hence the lower molds 50 upwardly along the guide rails 41. As the lower molds 50 ascend, the glass sheets G are transferred from the ring mold 3 to the lower molds 50. Upon continued ascending movement of the lower molds 50, the lower molds 50 lift the glass sheets G and press them against the lower molding surface 60a of the upper mold 60, as shown in FIG. 8(e). Opposite sides of the glass sheets G are now deeply bent between the upper mold 60 and the lower molds 50, so that the glass sheets G are finally bent in the press bending zone Z2.

Since the lower molds 50 which are dedicated to the pressing of the glass sheets G to shape are employed in the press bending zone Z2 for finally bending the glass sheets G between the upper mold 60 and the lower molds 50, the ring mold 3 may be of such a rigidity that is only sufficient to support and convey the glass sheets G. Therefore, the ring mold 3 may be relatively light in weight. Furthermore, inasmuch as the lower molds 50 are vertically movable, the upper mold 60 which is relatively heavy can be fixed in position. This allows the overall apparatus to be relatively simple in structure.

The ring mold 60 which supports the glass sheets G in the zones Z1, Z3 in the furnace 1 may be of a conventional configuration.

After the glass sheets G have finally been bent to shape, the lower molds 50 are moved downwardly away from the upper mold 60, placing the glass sheets G back on the ring mold 3. The glass sheets G on the ring mold 3 are thereafter conveyed into the annealing zone Z3 by the carrier 2. In the annealing zone Z3, the glass sheets G are gradually cooled to release stresses therefrom.

Figure 9:
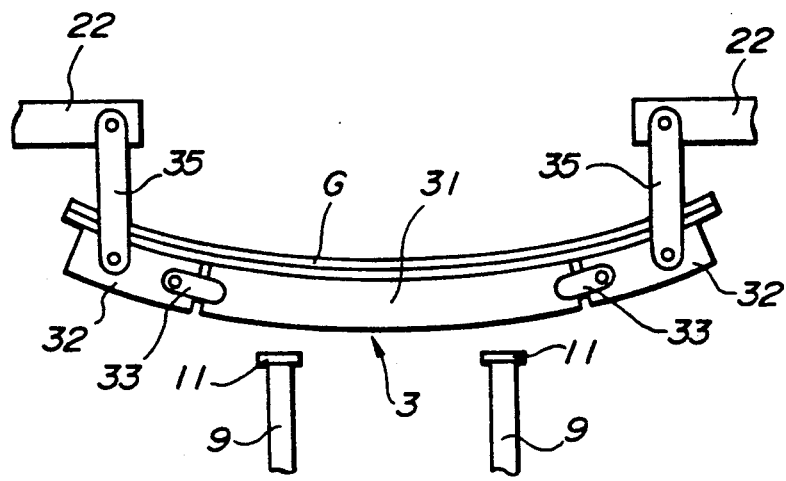
FIG. 9 is a front elevational view of a ring mold support mechanism according to another embodiment of the present invention.
Figure 10:
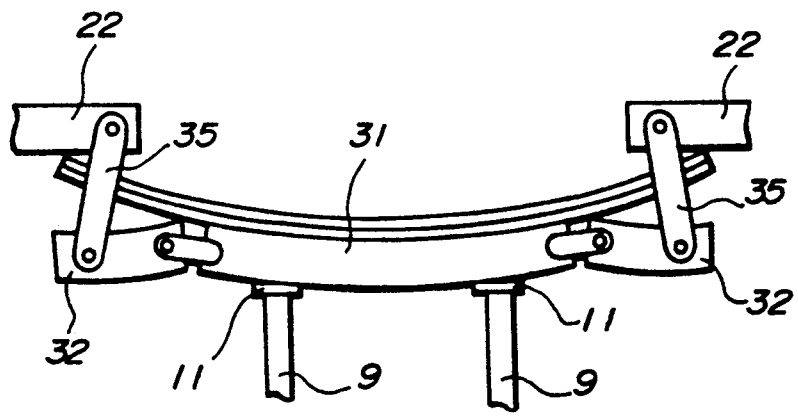
FIG. 10 is a front elevational view showing the manner in which the ring mold support mechanism shown in FIG. 9 moves.

FIGS. 9 and 10 show a ring mold support mechanism according to another embodiment of the present invention. As shown in FIG. 9, the wings 32 of the ring mold 3 are suspended by respective horizontal support beams 22 by links 35. As shown in FIG. 10, the wings 32 are turned outwardly, i.e., the ring mold 3 is opened, when the pads 1 on the upper ends of the shafts 9 push the central member 31 of the ring mold 3 upwardly.

Figure 11:
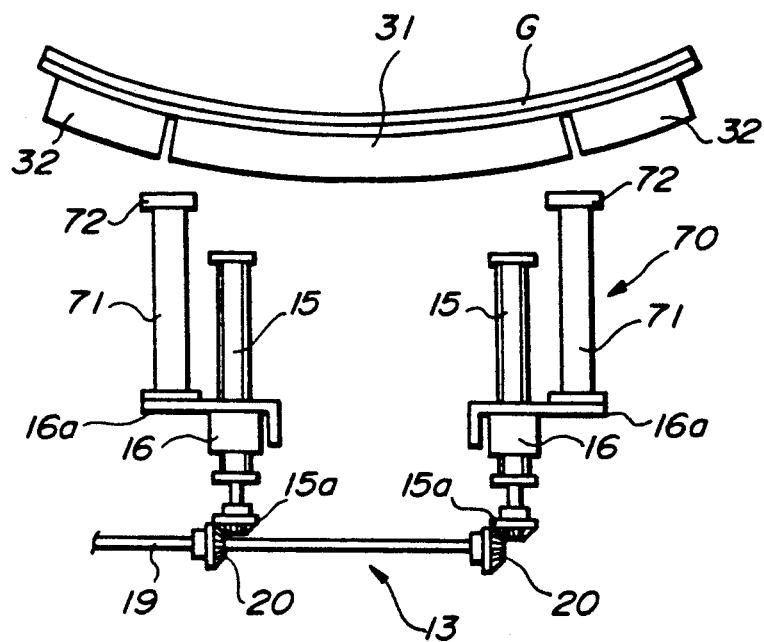
FIG. 11 is a front elevational view of a glass sheet lifting mechanism according to still another embodiment of the present invention.
Figure 12:
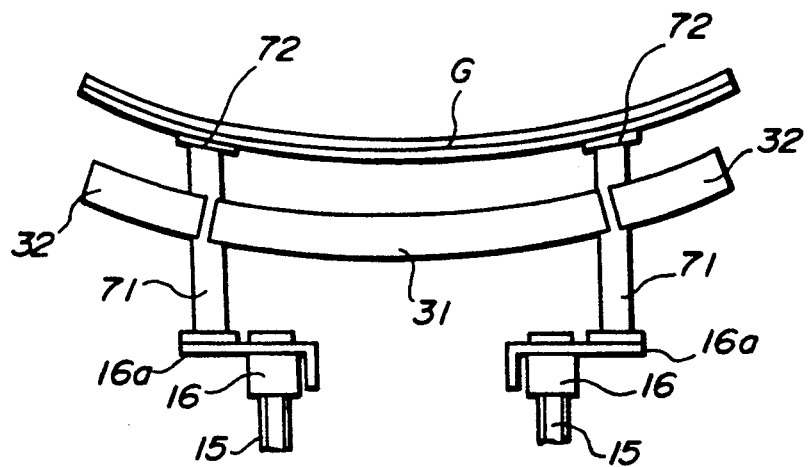
FIG. 12 is a front elevational view showing the manner in which the glass sheet lifting mechanism shown in FIG. 11 moves.

FIGS. 11 and 12 show a glass sheet lifting mechanism according to still another embodiment of the present invention. The glass sheet lifting mechanism, generally denoted at 70, may be employed in place of the mold opening mechanism 7. As shown in FIG. 11, the glass sheet lifting mechanism 70 has four (only two shown) lifter rods 71 mounted on the flanges 16a of the nuts 16 threaded over the screws 15 of the actuator mechanism 13. The lifter rods 71 are positioned within the ring mold 3 out of physical interference therewith. Pads 72 are mounted respectively on the upper ends of the lifter rods 71. When the screws 15 are rotated about their own axes to elevate the lifter rods 71, the pads 72 engage the lower surface of the glass sheets G and then lift them off the ring mold 3, as shown in FIG. 12. Subsequently, as described above with reference to FIGS. 8(d) and 8(e), the lower molds 50 are inserted below the glass sheets G, receive the glass sheets G, and lift and press the glass sheets G against the upper mold 60. In the embodiment shown in FIGS. 11 and 12, since the glass sheets G are lifted off the ring mold 3 by the lifter rods 71, the lower molds 50 may jointly be of a configuration which covers the entire peripheral edge of the glass sheets G.

Figure 13:
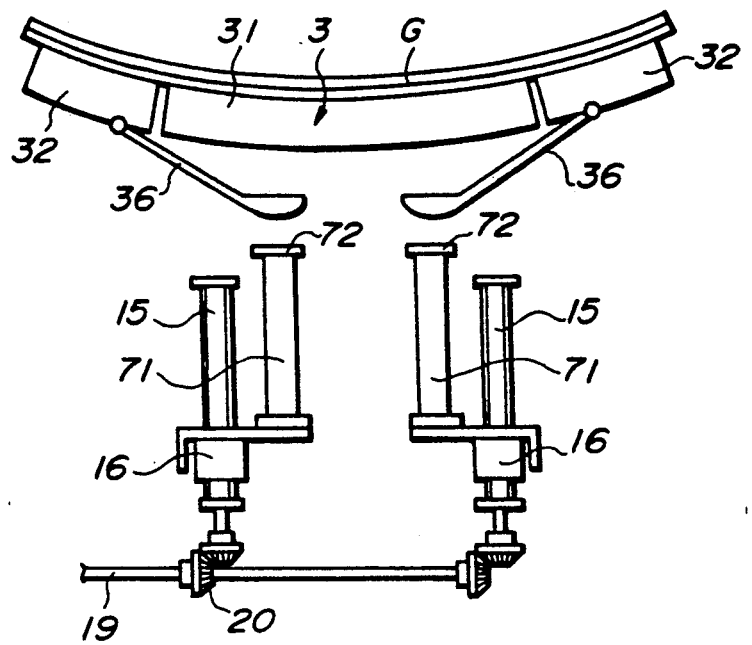
FIG. 13 is a front elevational view of a mold opening mechanism according to a further embodiment of the present invention.
Figure 14:
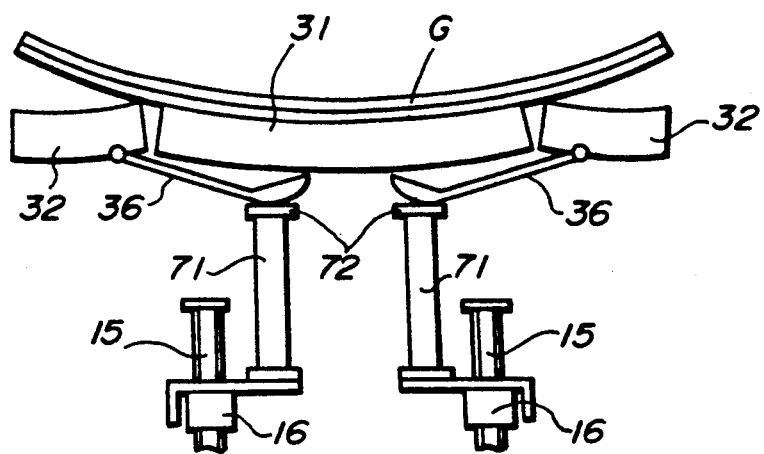
FIG. 14 is a front elevational view showing the manner in which the mold opening mechanism shown in FIG. 13 moves.

FIGS. 13 and 14 illustrate a mold opening mechanism according to a further embodiment of the present invention. As shown in FIG. 13, the mold opening mechanism includes arms 36 fixed at upper ends to the wings 32 and extending obliquely downwardly toward pads 72 on the upper ends of lifter rods 71 supported on the nuts 16. The arms 36 have respective lower ends positioned immediately above the respective pads 72. When the lifter rods 71 are elevated, the pads 72 push the lower ends of the arms 36, causing the wings 32 to turn outwardly for thereby opening the ring mold 3, as shown in FIG. 14.

Although there have been described what are at present considered to be the preferred embodiments of the invention, it will be understood that the invention may be embodied in other specific forms without departing from the essential characteristics thereof. The present embodiments are therefore to be considered in all respects as illustrative, and not restrictive. The scope of the invention is indicated by the appended claims rather than by the foregoing description.

What is claimed is:

1. An apparatus for bending a glass sheet, comprising:
    a furnace for heating a glass sheet therein, said furnace having a gravity bending zone for bending the glass sheet due to gravity, a press bending zone for bending the glass sheet under pressure, and an annealing zone for annealing the bent glass sheet;
    a ring mold for supporting the glass sheet thereon, said ring mold being movable, with the glass sheet supported thereon, along a feed path successively through said gravity bending zone, said press bending zone, and said annealing zone;
    said ring mold comprising a central member and a pair of opposite wings angularly movably coupled to said central member;
    said press bending zone comprising a fixed upper mold, a mold opening mechanism for turning said wings with respect to said central member when said ring mold is in said press bending zone, a movable lower mold assembly disposed below said fixed upper mold, and actuating means for moving said movable lower mold assembly to engage opposite edges of the glass sheet to lift and press the glass sheet against said upper mold.

2. An apparatus according to claim 1, wherein said movable lower mold assembly comprises a pair of lower molds positioned laterally one on each side of said feed path for engaging the opposite edges, respectively, of the glass sheet supported on said ring mold.

3. An apparatus according to claim 1, wherein said actuating means is disposed outside of said furnace.

4. An apparatus according to claim 1, furnace including an actuator mechanism disposed underneath said press bending zone for actuating said mold opening mechanism.

5. An apparatus for bending a glass sheet, comprising:
    a furnace for heating a glass sheet therein, said furnace having a gravity bending zone for bending the glass sheet due to gravity, a press binding zone for bending the glass sheet under pressure, and an annealing zone for annealing the bent glass sheet;
    a ring mold for supporting the glass sheet thereon, said ring mold being movable, with the glass sheet supported thereon, along a feed path successively through said gravity bending zone, said press bending zone, and said annealing zone;
    said ring mold comprising a central member and a pair of opposite wings angularly movably coupled to said central member;
    said press bending zone comprising a fixed upper mold, means disposed below said fixed upper mold for lifting the glass sheet off the ring mold when said ring mold is in said press bending zone, a movable lower mold assembly also disposed below and laterally of said fixed upper mold, and actuating means for moving said movable lower mold assembly to engage the glass sheet lifted off said ring mold, and to lift and press the glass sheet against said upper mold.

6. An apparatus according to claim 5, wherein said movable lower mold assembly comprises a pair of lower molds positioned laterally one on each side of said freed path for engaging the opposite edges, respectively, of the glass sheet lifted off said ring mold.

7. An apparatus according to claim 5, wherein said actuating means is disposed outside of said furnace.

8. An apparatus according to claim 5, further including an actuator mechanism disposed underneath said press bending zone for actuating said lifting means.

9. A method of bending a glass sheet, comprising the steps of:
    preliminarily bending a glass sheet on a ring mold in a gravity bending zone in a furnace;
    feeding the preliminarily bent glass sheet with the ring mold along a feed path into a press bending zone in the furnace;
    exposing opposite edges of the glass sheet supported on the ring mold;
    moving lower molds into engagement with the opposite edges of the glass sheet, said lower molds being positioned laterally one on each side of said feed path;
    moving said lower molds to lift the glass sheet and pressing the glass sheet against a fixed upper mold for finally bending the glass sheet;
    thereafter, lowering said lower mold with the finally bent glass sheet until the glass sheet is placed on said ring mold; and feeding the glass sheet wit the ring mold into an annealing zone in the furnace.

10. A method of bending a glass sheet, comprising the steps of:
    preliminarily bending a glass sheet on a ring mold in a gravity bending zone in a furnace;
    feeding the preliminarily bent glass sheet with the ring mold along a feed path into a press bending zone in the furnace;
    lifting the glass sheet off the ring mold in said press bending zone;
    transferring the lifted glass sheet to a movable lower mold assembly in said pressing bending zone;
    lifting said lower mold assembly to press the glass sheet against a fixed upper mold for finally bending the glass sheet;
    thereafter, lowering said lower mold with the finally bent glass sheet until the glass sheet is placed on said ring mold; and
    feeding the glass sheet with the ring mold into an annealing zone in the furnace.

11. A method according to claim 10, wherein said movable lower mold assembly comprises a pair of lower molds positioned laterally one on each side of said feed path, said step of transferring comprising moving said lower molds into engagement with opposite edges of the lifted glass sheet.

* * * * *